Dec. 17, 1929.  J. N. HELTZEL  1,740,345
TRAFFIC LINE AND JOINT MACHINE AND METHOD OF PRODUCING SAME
Filed Feb. 4, 1925  5 Sheets-Sheet 1

Inventor:
J. N. HELTZEL,
By Monroe E. Miller
Attorney

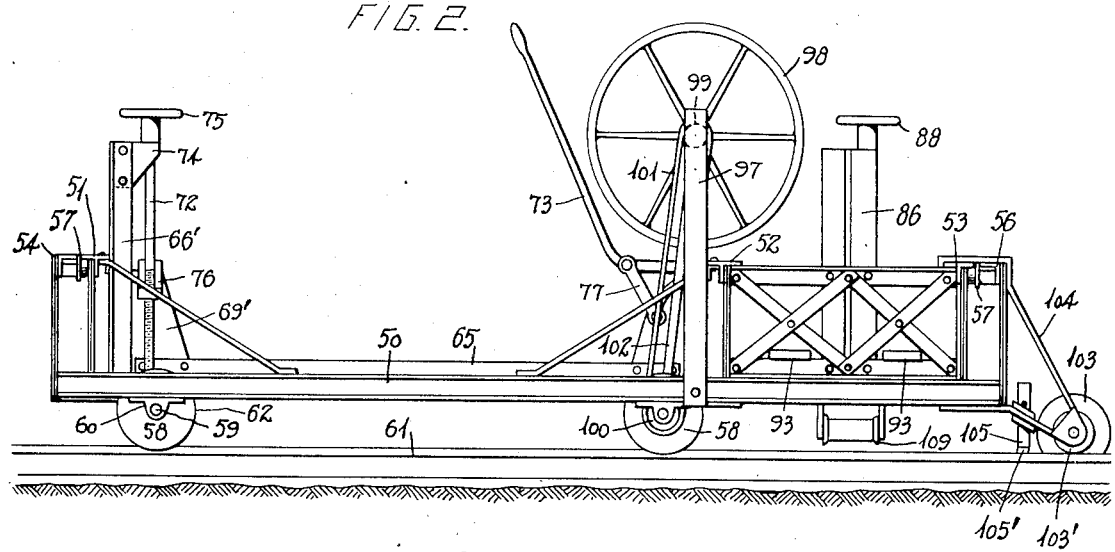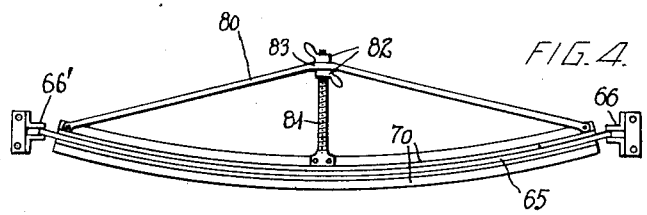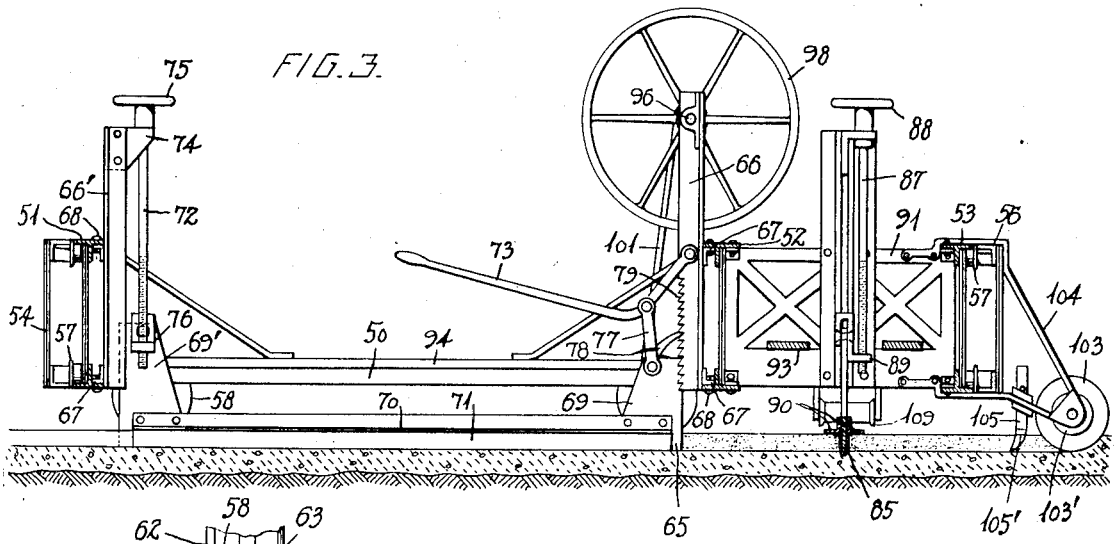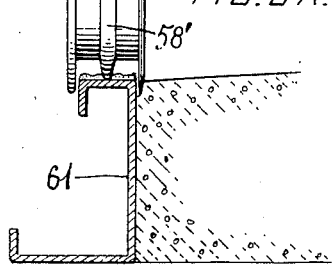

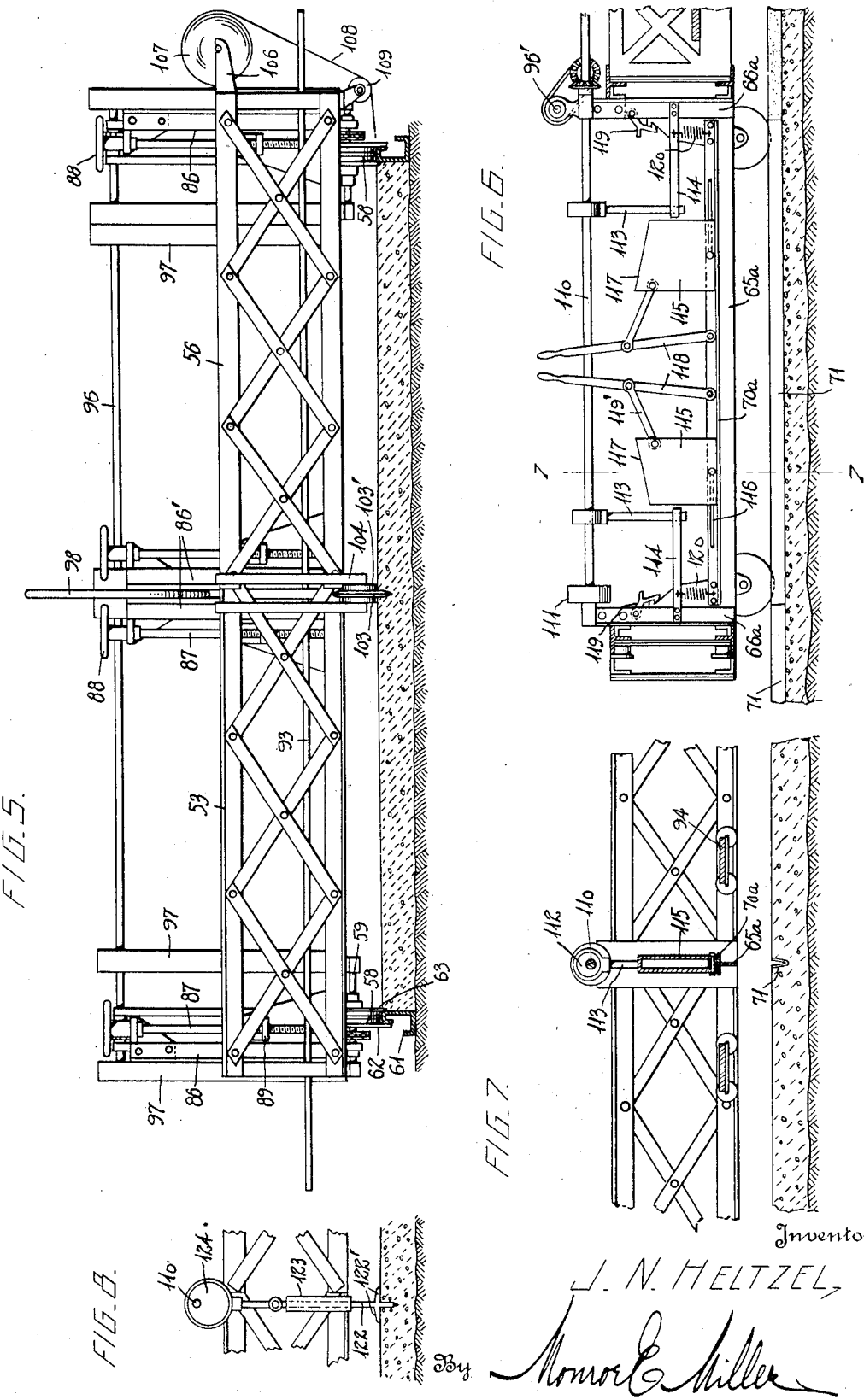

Dec. 17, 1929.   J. N. HELTZEL   1,740,345
TRAFFIC LINE AND JOINT MACHINE AND METHOD OF PRODUCING SAME
Filed Feb. 4, 1925   5 Sheets-Sheet 4

Inventor
J N HELTZEL
By
Attorney

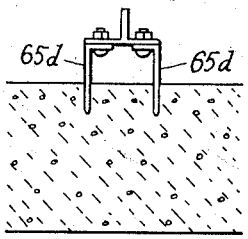
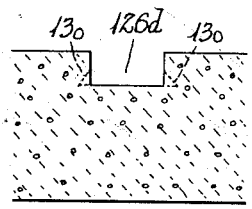
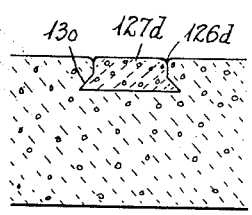
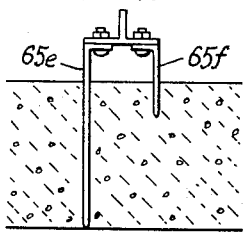
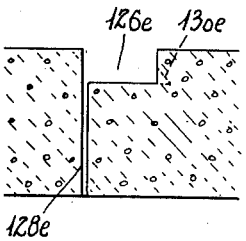
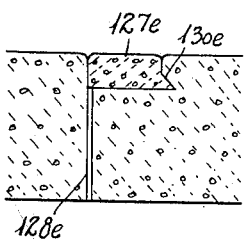
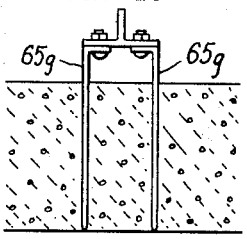
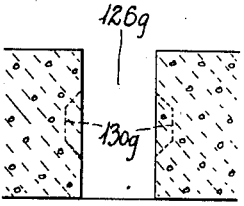
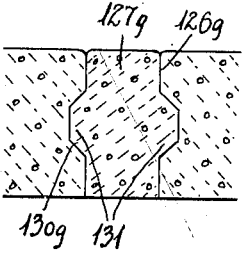
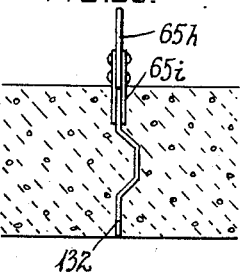
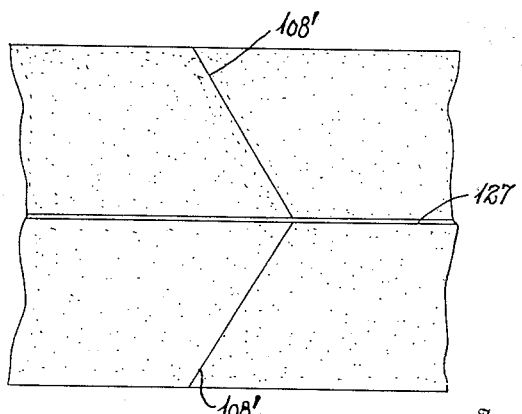

Patented Dec. 17, 1929

1,740,345

UNITED STATES PATENT OFFICE

JOHN N. HELTZEL, OF WARREN, OHIO

TRAFFIC-LINE AND JOINT MACHINE AND METHOD OF PRODUCING SAME

Application filed February 4, 1925. Serial No. 6,806.

The present invention relates to concrete road building apparatus, and aims to provide a novel and improved machine for and method of producing joints and traffic lines in a concrete road while being built, and the machine being so operable that the joints and traffic line may be installed with mechanical precision and perfect alinement, and in an economical and efficient manner.
By natural process, due to changes in temperature or climatic conditions and consequent contraction and expansion, and due to the heaving and sinking of the sub-base or ground, it is usual for solid concrete roads to break into sections, and it is is therefore highly desirable that the road, when built, be made in sections or slabs to allow for expansion and contraction and also a flexing movement between the slabs. The provision of both longitudinal and transverse joints in concrete roads has been a problem, both on account of expensive cost of installation, and difficulties attendant to proper installation or production of the joints. Longitudinal construction or center joints are desirable to split the road into opposite side sections or slabs, and also to serve as traffic lines for dividing traffic moving in opposite directions. If allowed to occur naturally, such longitudinal joints, caused by the cracking or breaking of the concrete, will be irregular and unsightly, as well as resulting in rapid deterioration of the road by the ravelling or chipping off of the concrete along the cracks. Artificial longitudinal construction joints are preferred, but have been difficult to produce heretofore in a neat and uniform manner. It has been the practice to embed division plates in the concrete structure, for dividing the road along a longitudinal line. These division plates are costly and are practically impossible to install in alinement or with satisfactory uniformity. The division plates are difficult if not impossible to install to proper grade and alinement, and also interfere with rapid pouring of the concrete, thereby holding up the work of road-building materially. Such division plates must be placed on the sub-grade and staked or otherwise held in position prior to the pouring of the concrete, thereby necessitating placing and securing the division plates in advance of the concrete mixer. It is often the case that the concrete mixer must be stopped for the installation of the joint or division plates. The division plates cannot be installed in true alinement or to proper grade, and involve considerable expense both for material and installation. Also, the production of a traffic line in connection with such division plates is unsatisfactory, because of improper alinement and objections arising from the use of traffic line forms on the division plates as heretofore attempted.

Similar difficulties and objections are attendant to the production of artificial transverse joints by methods heretofore attempted. It has been difficult to properly produce transverse joints without incurring prohibitive expense, and the practice of installing artificial transverse joints has been practically abandoned by many highway departments. Hence, the transverse joints are generally allowed to develop at random, causing irregular transverse cracks, due to the contraction of the concrete structure after its final set. These natural cracks are not always transversely of the road but frequently run at oblique angles, resulting in irregular cracks or divisions, producing ragged edges and resulting in the disintegration of the road due to the concrete ravelling or chipping off along the cracks.

The machine forming the subject matter of the present invention is intended to produce either or both the longitudinal and transverse joints after the concrete or grout has been poured and given its initial finish, in order that the joints may be produced quickly and conveniently at minimum cost, and with perfect alinement and precision. Furthermore, a traffic line may be produced in combination or as a unit with the longitudinal joint.

Another object is the provision of such a machine by means of which joint forming or cutting blades or members are forced down into the concrete while plastic or before receiving its final set, for conveniently and efficiently producing the joints.

A further object is the provision of novel means for mounting and actuating the concrete piercing or cutting blades or members so that they may be effectively forced into and retracted from the concrete.

A still further object is the provision of such a machine which is adjustable for roads of different widths, or a road of varying width, and for curves in the road.

The invention also has for an object the improvement of the machine in other particulars, in order to increase its efficiency and utility, as will hereinafter more fully appear, it being understood that changes can be made within the scope of what is hereinafter claimed, without departing from the spirit of the invention.

The invention is illustrated in the accompanying drawings, wherein—

Fig. 2 is a side elevation thereof with the concrete piercing blades raised.

Fig. 3 is a longitudinal section on the line 3—3 of Fig. 1 showing the blades depressed into the concrete.

Fig. 4 is a plan view of the longitudinal joint forming blade and accompanying parts, showing such blade bent or bowed for a curve in the road.

Fig. 5 is a front view of the machine.

Fig. 5ª is a detail view of one of the wheels.

Fig. 6 is a fragmentary sectional view corresponding with Fig. 3 illustrating further improvements.

Fig. 7 is a transverse section on the line 7—7 of Fig. 6.

Fig. 8 is a detail view of a spading device used with the machine shown in Figs. 6 and 7.

Figure 1:
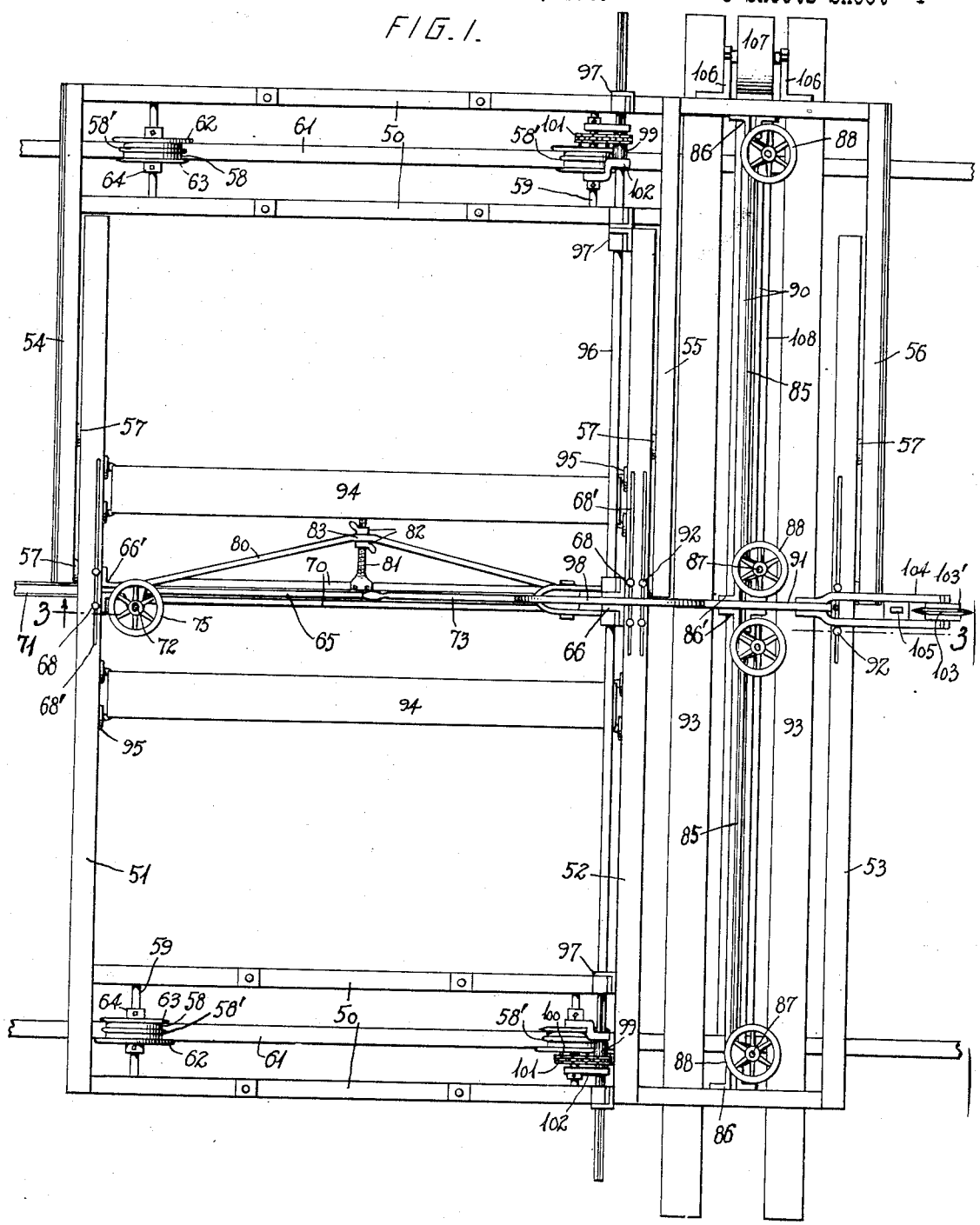
Figure 1 is a plan view of the machine.
Figure 9:
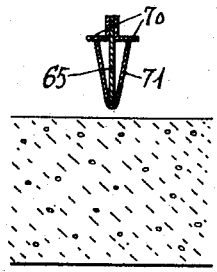

Fig. 9 is a transverse section of the mandrel blade for producing a longitudinal joint, showing the joint and traffic line form thereon.

Figure 10:
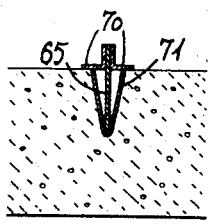

Fig. 10 is a cross section showing such blade and form forced down into the concrete.

Figure 11:
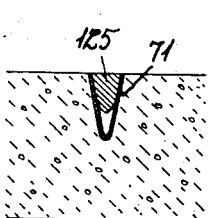

Fig. 11 is a cross section showing the blade withdrawn and a closure and spreader bar positioned in the form.

Figure 12:
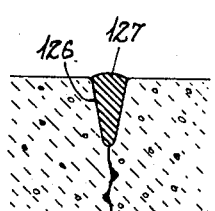

Fig. 12 is a cross section showing the completed longitudinal construction joint and traffic line.

Figure 13:
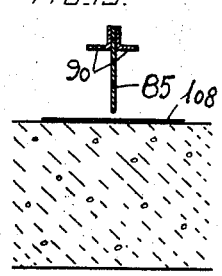

Fig. 13 is a cross section of one of the mandrel blades for producing the transverse joints showing the joint forming strip or sheet on the concrete.

Figure 14:
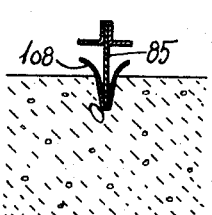

Fig. 14 is a cross section showing the strip being forced down into the concrete by the blade.

Figure 15:
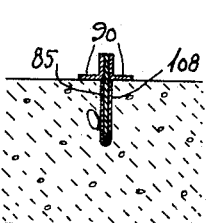

Fig. 15 is a cross section showing the strip completely forced down into the concrete with the blade.

Figure 16:
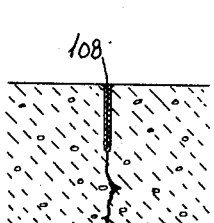

Fig. 16 is a cross section showing the completed transverse joint.

Figure 17:
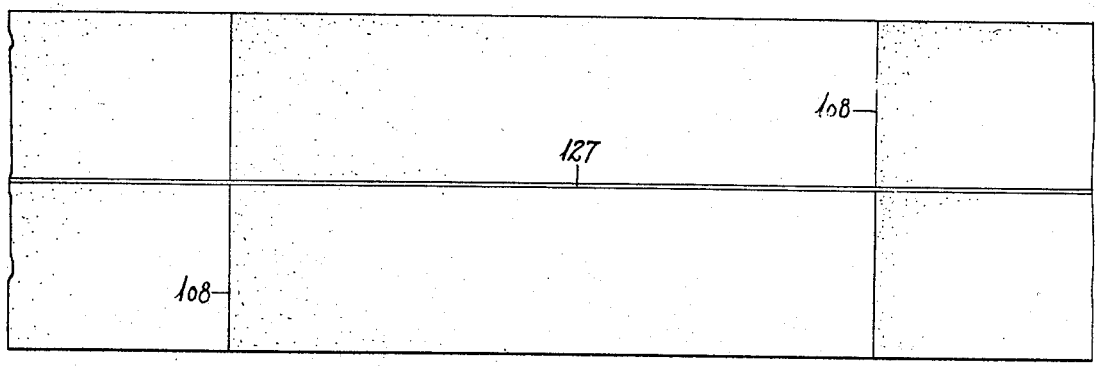

Fig. 17 is a fragmentary plan view of a concrete road with the longitudinal joint and traffic line and the transverse joints as produced or built by the machine.

Figure 18:
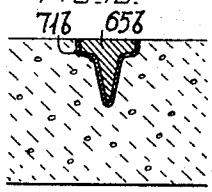

Fig. 18 is a cross section corresponding to Fig. 10 illustrating a modification in the mandrel and form for producing a joint with a wide traffic line.

Figure 19:
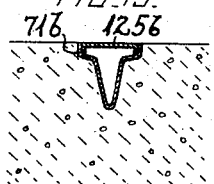

Fig. 19 is a cross section showing the mandrel removed and a cap and spreader positioned in the form.

Figure 20:
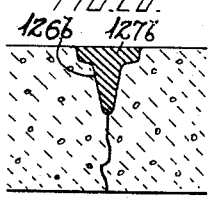

Fig. 20 is a cross section of the joint and traffic line produced by the form shown in Figs. 18 and 19.

Figure 21:
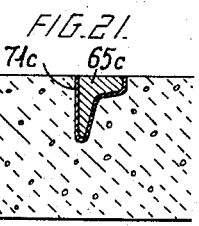
Figure 22:
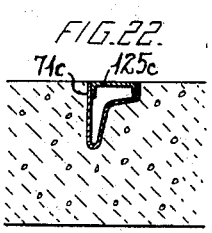
Figure 23:
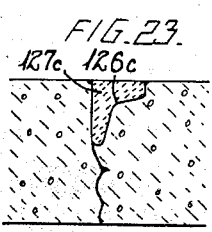

Figs. 21, 22 and 23 correspond with Figs. 18, 19 and 20 and illustrate another modification in the production of the longitudinal joint and traffic line.

Fig. 24 is an end view of a double cutter blade device for use in the machine to produce a traffic line in the road, showing the blades forced down into the concrete.

Fig. 25 is a cross section showing the channel formed in the concrete.

Fig. 26 is a cross section showing the completed traffic line.

Figs. 27, 28 and 29 correspond with Figs. 24, 25 and 26, showing a modification, one blade cutting the concrete down to the sub-base to split the road.

Fig. 30 is an end view of a double blade device for cutting the concrete down to the sub-base.

Fig. 31 is a cross section showing the concrete removed between the cuts made by the blades shown in Fig. 30, to produce a channel down to the sub-base.

Fig. 32 is a cross section of the completed double construction joint and traffic line.

Fig. 33 is an end view of a division plate installing member or device to be used with the machine, showing the division plate installed.

Fig. 34 is a fragmentary plan view of a completed road showing oblique expansion joints between the longitudinal joint and traffic line and the edges of the road.

A wheel mounted frame or chassis carries the working parts of the machine, and provides a travelling bridge spanning the road. The frame is adjustable transversely for different widths of roads, or is extensible and contractile transversely. The frame is composed of the pairs of parallel longitudinal beams 50 at the opposite sides connected by transverse trusses composed of overlapping adjustably connected sections. Thus, the frame is composed of two side sections, each of which has a pair of beams 50, and one frame section includes the truss members 51, 52 and 53, while the other frame section includes the members 54, 55 and 56 overlapping the members 51, 52 and 53, respectively. Said truss members are preferably of lattice-work construction, and rollers or wheels 57 are carried by the members 54, 55 and 56 and travel along flanges of the members 51, 52 and 53, said flanges being provided by angle or T irons, as seen in Figs. 2 and 3. The frame can therefore be extended and contracted transversely to vary the width thereof according to the width of the road.

The frame is supported for movement along the road by wheels 58 which are mounted on transverse axles 59 which are disposed in bearings 60 secured to the beams 50. Said wheels are slidable on the axles transversely of the frame between the beams 50, to provide further adjustments to accommodate the width of the road. Said wheels 59 roll on the side rails or forms 61 which define the sides or edges of the road, and the wheels have outer flanges 62 to overlap the outer sides of said rails. The wheels are also provided with inner flanges 63 overlapping the inner sides of the rails 61 and so formed that in moving between the rails and concrete they round off or bevel the edges or corners of the road. Collars 64 are disposed on the axles 59 at opposite sides of the wheels and are secured to the axles by means of set screws or otherwise, whereby said wheels at one side of the road may be maintained in adjusted transverse positions on their axles, while the opposite wheels may slide on their axles to accommodate the machine to variations in the width of the road, with the longitudinal joint produced parallel to the firstnamed side of the road. Each wheel 58 is provided on its periphery with a circumferential rib 58' between the flanges 62 and 63. This rib has a rounded ridge to bear on the rail or form member, as seen in Fig. 5ª, and the sides of the rib diverge apart. The rib 58' rides on the rail or form member, and is of a height to space the rim of the wheel above the rail, with a clearance of greater height than the depth of the film of concrete which may be on the tread of the rail owing to the concrete overflowing when finishing the surface of the road. The rib thus penetrates the film of concrete that may be on the rail, in order that the wheel will have contact with the tread of the rail. The rib will also ward off and deflect to the sides thereof pebbles lying in the path of the rib, to avoid the wheel being raised off the rail. Any suitable scraper may be used for scraping concrete from the periphery of the wheel, to prevent the concrete filling of the channels between the rib 58' and flanges 62, 63.

The longitudinal joint and traffic line producing means comprises a longitudinal mandrel or cutting blade 63 disposed between the truss members 51 and 52 intermediate the opposite sides of the frame, and having its ends guided for vertical movement in vertical slotted guides 66 and 66', so that said blade can be raised and lowered. The guides 66 and 66' are carried by the frame and are adjustable transversely, so that the blade may be positioned midway between the sides of edges of the road. Thus, as shown, said guides have the portions or flanges 67 overlapping the upper and lower flanges of the truss members 51 and 52 and secured to said members by means of bolts 68 or other securing elements, said members 51 and 52 having slots or apertures 68' to receive said bolts in the different adjustments of the blade transversely of the frame. The blade 65 has upstanding portions 69 and 69' at its ends working in the guides 66 and 66', and said blade is provided at opposite sides with outstanding flanges 70 to press down or tamp the concrete along the opposite sides of the cut made, as will hereinafter more fully appear. The blade 65, as shown in Figs. 3, 9 and 10, is used to force down a form 71 into the plastic concrete for producing the joint and traffic lines. Said form comprises a sheet metal strip or plate doubled on a longitudinal line so that the form is of V-shaped cross section.

Means are provided for depressing the blade 65 to force said blade and the form 71 down into the concrete, and comprise, as shown, a screw 72 and hand lever 73 for the opposite ends of the blade. The screw 72 is disposed vertically and is swivelled, as at 74, to the upper end of the guide 65', and has a hand wheel 75 at its upper end for rotating the screw by hand. The lower terminal of the screw is screw-threaded through a nut 76 which is pivoted to the portion 69' of the blade, whereby the rotation of the screw will move the rear end of the blade vertically. The lever 73 is fulcrumed to the guide 66 and is connected by a link 77 with the portion 69 of the blade for raising and lowering the forward end of the blade. A pawl 78 is also pivoted to the portion 69 and is engageable with ratchet teeth 79 with which the guide 66 is provided, so as to hold the forward end of the blade down, although the blade can be raised with the lever 73 by disengaging the pawl from the ratchet teeth. The devices for raising and lowering the blade 65 are carried by the guides 66 and 66' of the blade so that the entire mechanism is adjustable as a unit transversely of the frame.

The blade 65 is of resilient metal as well as the flanges 70, so that it can be sprung or bowed into arcuate shape for curvatures of different radii. For this purpose a rod 80 is secured at its ends to the end portions of one flange 70, and a screw 81 is secured to said flange intermediate the ends thereof and is disposed at right angles to the blade at one side thereof. The screw 81 passes slidably through an aperture or eye 83 with which the rod 80 is provided intermediate the ends thereof, and nuts 82 are threaded on said screw at the opposite sides of the rod 80. It will be apparent that the blades 65 can therefore be sprung toward either side by adjusting the nuts 82 on the screw 81. As shown in Fig. 4, the screw 81 is adjusted to receive a compression strain for bowing the blade 65 away from the rod 80, and the screw may be adjusted in the opposite direction to receive a tensile strain for springing the blade toward the rod 80. In this way the blade 65 can be sprung into a curved shape to conform to a curve in the road.

The transverse joint producing means are similar to the longitudinal joint producing means and comprise the transverse mandrel or cutting blades 85 disposed in alinement with their adjacent ends at the longitudinal line of the blade 65. The outer and inner ends of the blades 85 are movable vertically in vertical slotted guides 86 and 86', respectively, and screws 87 similar to the screw 72 are used for raising and lowering the blades 85. The screws 87 are swivelled to the guides 86 and 86', and have hand wheels 87 at their upper ends, the lower terminal portions of the screws being threaded in nuts 89 pivoted to the end portions of the blades 85. The blades 85 have the outstanding flanges 90 at the opposite sides thereof similar to the flanges 70 of the blade 65. Blades 85 are used which are of lengths to accommodate the particular width of road being built and blades of different lengths are used interchangeably for roads of different widths.

The guides 86 are secured to the outer beams 50 between the truss members 53, 56 and 52, 55, and the guides 86' are secured to a longitudinal vertical partition 91 which is adjustably secured, as at 92, to the truss members 52 and 53 similar to the attachment of the guides 66 and 66' to the corresponding truss members. The partition 91 can therefore be adjusted transversely on the frame similar to the blade 65 so that said blade and partition are in longitudinal alignment with the center line or longitudinal joint line of the road.

Transverse planks or boards 93 are disposed at opposite sides of the blades 85 and are supported by the partition 91 and sides of the frame, to support the workmen while forming the transverse joints.

Longitudinal boards 94 for supporting workmen are disposed at opposite sides of the blade 65 and are adjustable transversely so as to be positioned any where between the sides of the frame and the blade 65. As shown, the boards 94 have wheels or rollers 95 travelling in the truss members 51 and 52 so that said boards may be conveniently moved.

The machine is propelled by hand power, as shown in Figs. 1, 2, 3 and 5. A transverse power shaft 96 is journaled in the upper portion of the guide 66 and in pedestals 97 secured to the opposite side portions of the frame, and a hand wheel 98 is secured on the shaft 96 and is located within the guide 66 for conveniently rotating said shaft by hand. The power is transmitted from the shaft 96 to the front wheels 58 by means of sprocket wheels 99 on the shaft 96 and sprocket wheels 100 secured to the front wheels 58, with sprocket chains 101 passing around said sprocket wheels. The sprocket wheels 99 are splined or feathered on the shaft 96 so as to be adjusted transversely of the frame with the wheels 58, and sliding bars 102 engage the shaft 96 and the front axles 59 so that the sprocket wheels 99 and sprocket chains will be shifted or adjusted transversely with the front wheels 58.

A colter wheel or disk-shaped rotary blade 103 is mounted in a bracket 104 to cut into the concrete as the machine is propelled forwardly, thereby slitting the concrete in advance of the blade 65 and performing another important function. Thus, the wheel 103 will depress or deflect to opposite sides pebbles, broken stone and other solid particles which lie in the line of the longitudinal joint, so that the blade 65 and form 71 can be made to enter the concrete more easily. This action is assisted by a depending blade 105 carried by the bracket 104 and following immediately in rear of the wheel 103. The bracket 104 is preferably secured to the partition 91 so that the wheel 103 and blade 105 will be positioned in alinement with the blade 65 when said partition is adjusted. The wheel 103 has outstanding annular flanges 103' and the blade 105 has outstanding flanges 105' at opposite sides, which flanges smooth down the concrete along the opposite edges of the incision or cut made by said wheel and blade. Said flanges serve to hold down the coarse aggregate and thus prevent the deforming of the surface by the action of said wheel and blade.

In using the present method, the rotary disk or wheel 103 and blade 105 produce a slit or incision in the plastic concrete after the surface thereof has been finished, and said blades 103 and 105 also deflect broken stones, pebbles and other solid particles to opposite sides of the line of the joint. The joint producing material or strip is then forced downwardly into the slit or cleft. Such slit or cleft will remain open if the concrete has set sufficiently to remain firm. However, when the material is rather soft, the cement, sand and finer material may flow back into the slit or incision behind the blades 103 and 105, although the stones and coarser aggregate will remain separated. Such finer material is readily displaced again by the blade 65, so that the flowing of the finer matter back into the slit in rear of the blades 103, 105 does not interfere with the installation of the joint.

One side of the frame has brackets 106 or other means for supporting a roll 107 of paper, fabric, metal or other suitable material for producing the transverse joints and from which the joint forming strip 108 can be unwound conveniently to be drawn across the concrete. A roller 109 is carried by the frame under which the strip 108 is moved in pulling the strip across the concrete.

Figs. 6, 7 and 8 illustrate modifications in the machine for use especially if the machine is driven by an engine or motor. A longitudinal power shaft 110 is journaled in bearings secured on the guides 66ª in which the mandrel or cutter blade 65ª is movable, and said shaft furnishes power for driving the blade 65ª down into the concrete with a vibratory motion. The shaft 110 has a pulley wheel 111 for connecting it with the engine or motor, and eccentrics 112 are secured on said shaft and vibrate the driving plungers 113 which are slidable upwardly and downwardly in brackets 114 carried by the guides 66 and 66'. Slides 115 are mounted on the blade 65ª, being movable on the flanges 70ª, and being guided by slots 116 in the blade. Said slides are adapted to be moved under the plungers 113 and have the inclined upper surfaces 117 to receive the blows of the plungers 113. Said slides are slid by hand levers 118 fulcrumed on the blade 65ª and connected by links 119' with the slides. The blade 65ª is held raised by means of suitable catches 119, thereby supporting the blade off the road, and coiled springs 120 are connected to the blade 65ª and with the brackets 114 carried by the guides 66ª, said springs yieldingly raising the blade 65ª.

When the catches 119 are disengaged from the blade 65ª said blade can be depressed to position it close to the surface of the concrete, and then by swinging the levers 118 the slides 117 may be moved under the plunger 113. The plungers being reciprocated will result in successive blows being given the slides 117 and blade 65ª, and my moving the slides 117 further and further under the plungers 113. the blade 65ª is driven or forced down into the concrete with a vibratory motion, the springs 120 lifting the blade 65ª slightly after each blow. The blade 65ª and form are therefore driven down effectively into the concrete, and when the slides 117 are retracted the blade 65ª will be retracted by the springs 120.

Fig. 6 also shows the propelling shaft 96' geared to the power shaft 110 so that the machine may be propelled by power.

Fig. 8 shows a spading device at the front of the machine to depress and deflect pebbles, stone fragments and other particles out of the line of the longitudinal joint. This device comprises a spading member or plunger 122 slidable in a guide 123, and reciprocated vertically by an eccentric 124 on the shaft 110. The plunger 122 being reciprocated vertically is forced into and out of the concrete in advance of the blade 65ª, as the machine moves forward, so as to depress and deflect the solid particles below and to opposite sides of the line of the blade 65ª and form thereon. The plunger 122 has outstanding flanges 122' at opposite sides to tamp the concrete or aggregate down at opposite sides of the line of operation of the plunger 122, thereby keeping the surface of the road smooth.

The joints made by the machine and method of forming the same are substantially the same as disclosed in my copending application Serial No. 3,972, filed Jan. 22, 1925, and briefly described are as follows:

Figs. 9 to 12, inclusive, illustrate the method of producing the longitudinal joint and traffic line. As shown in Fig. 9, the form 71 is positioned above the concrete and the mandrel blade 65 is moved downwardly between the sides or wings of the form with its lower edge seated in the bend of said form, and the edges of the form may abut the flanges 70. The mandrel blade is then forced downwardly to depress the form into the plastic concrete until the flanges 70 come into contact with the concrete. Said flanges will smooth down or tamp the surface of the concrete along the opposite sides of the cut made in the concrete. The fragments or particles of solid matter having been depressed or deflected out of the line of the mandrel 65 will enable the form 71 to enter the concrete without obstruction by such particles. The mandrel blade is then raised to withdraw it from the form, leaving the form in the concrete, and a closure and spreader bar 125 is then inserted between the wings or sides of the form, as seen in Fig. 11, to close the form and exclude concrete therefrom, as well as holding the sides of the form spread apart. The surface of the concrete can then be finished off, and such operation may be performed over the form 71. The edges of the concrete are rounded or bevelled off along the form, and after the concrete has set sufficiently, the bar 125 is removed. This will permit the sides of the form 71 to spring toward one another, and the form is then readily removed from the concrete, leaving a V-shaped groove 126. This groove is filled with an asphalt, tar or other suitable filler, which seals the joint, as well as providing a traffic line. After the concrete has hardened it will eventually crack or break, as at 128, below the groove 126 to divide the road into sections or slabs at opposite sides of the longitudinal joint and traffic line. The broken surfaces being irregular will interlock, with a dowel effect, to prevent relative vertical displacement between the slabs, but permitting the slabs to flex relatively to one another with a hinging action.

In forming the longitudinal joint and traffic line, it is made continuous, the joint and traffic line machine following in rear of the concrete mixer. The joints are made after the plastic concrete has received its initial finish. After one form 71 has been deposited in the concrete, and the mandrel blade 65 raised, the machine is propelled forward, and the next form is then deposited in the concrete, said forms being disposed end to end. Such forms are used repeatedly, being removed from the road after the concrete has set.

Figs. 13 to 16, inclusive, depict the method of producing the transverse joints. The strip 108 is extended transversely across the concrete, and is cut to length corresponding with the lengths of the blades 85, so that each strip extends from the line of the longitudinal joint to the corresponding side or edge of the road. After the strip 108 is positioned on the concrete below the blade 85, as seen in Fig. 13, the blade is forced downwardly, and its lower edge contacts with the strip intermediate the edges of the strip, thereby doubling the strip on the blade, as seen in Fig. 14, as the blade forces the intermediate portion of the strip down into the concrete. The sides or wings of the strip are thereby folded against the sides of the blade, and the strip is forced down into the concrete with its bend lowermost. The edges of the strip are at or slightly below the surface of the concrete when the strip is completely forced into the concrete, as seen in Fig. 15. The flanges 90 press down or tamp the surface of the concrete along the opposite sides of the incision made. The blade is then raised to retract it from the doubled or folded strip, thereby depositing the strip in the concrete, and the pressure of the concrete against the opposite sides of the strip 108 will press said sides together. The edges of the concrete are then rounded off or bevelled along the edges of the strip 108, after the surface of the concrete has been finished over the strip. After the concrete has hardened it will eventually break under the strip 108, as at 129, and the adjacent surfaces of the slabs thus formed will be interlocked to prevent relative vertical displacement between them but to enable the sections to flex relatively with a hinging action.

In producing both the longitudinal and transverse joints it is preferable to vibrate the mandrel or cutting blades so as to facilitate their entry into the concrete.

Fig. 17 illustrates the completed road having the longitudinal traffic line and construction joint 127, and the transverse joints 108. The joints 108 are produced at suitable intervals, preferably about fifty feet apart, and permit of expansion and contraction. The joints between the longitudinal traffic line and construction joint 127, and the edges of the road may also be arranged obliquely, as indicated at 108' in Fig. 34. This is readily accomplished by adjusting the guides 86 and 86' so as to position the blades 85 obliquely, and said guides may be adjustable longitudinally of the frame the same as the guides 66 and 66' are adjustable transversely in the frame. The oblique joints 108' are of advantage in that the opposite side wheels of vehicles passing over the joints will not pass thereover simultaneously, so that only one wheel of each pair will be over the joint at a time. This will relieve the joints of a great deal of impact, thereby reducing the strains and possibility of the concrete breaking at the joints, inasmuch as the simultaneous impact of both wheels of a pair over the joint is double that of one wheel.

Figs. 18, 19 and 20 illustrate a modification in the formation of the longitudinal joint and traffic line. The mandrel $65^b$ is of T-shaped cross section, and the form $71^b$ is of similar shape. After the form is deposited in the concrete by the mandrel, and the mandrel removed, the closure and spreader $125^b$ is positioned between the offset edge portions of the form, as seen in Fig. 19, to close the form and hold it spread to the proper width. The member $125^h$ and form $71^b$ are removed after the concrete has set, and the groove $126^b$ will have a wide mouth or channel at the surface of the concrete, thereby producing a wide traffic line when the filler $127^b$ is placed in said groove.

Figs. 21, 22 and 23 illustrate a further modification. The mandrel $65^c$ is of angular form, and the form $71^c$ is of similar shape. After the form is deposited in the concrete and the mandrel removed, the cap $125^c$ is positioned in the form, as seen in Fig. 22, and said cap and form are removed after the concrete has set. The groove $126^c$ is of angular form, as seen in Fig. 23, and the concrete will break below one side of the groove, so that the filler $127^c$ may be of concrete, inasmuch as there is no liability of said filler breaking or cracking, whereas the filler $127^h$ shown in Fig. 20 is preferably of asphalt, tar or similar composition, so as to be yieldable to avoid breaking thereof inasmuch as said filler extends across the fracture or break that occurs below the groove.

The machine can be used for other joint and traffic line producing operations. Figs. 24, 25 and 26 illustrate the production of a traffic line. A pair of cutter blades $65^d$ are moved downwardly by the machine to cut into the concrete along parallel lines. This is done after the concrete has received its initial set. The concrete is then routed out or removed from between the cuts made, providing a groove or channel $126^d$, as seen in Fig. 25. It is then preferable to under-cut the sides of the channel, as at 130. The channel is then filled with concrete to produce the traffic line $127^d$ which will be keyed to the road. The material used for the traffic line is preferably white concrete or so colored as to distinguish from the concrete used for the road proper.

Figs. 27, 28 and 29 illustrate a modification. Thus, one blade $65^e$ is of sufficient depth to cut down to or near the sub-base, while the other blade $65^f$ only cuts down a short distance below the surface of the concrete. Then when the blades are withdrawn the concrete is routed out between the cuts made, producing the channel $126^e$, and a division or cut $128^e$ will be left by the blade $65^e$ extending down from one side or wall of the channel to the sub-base, so as to divide the road into opposite sections or slabs. The opposite side or wall of the channel $126^e$ may be under cut, as at $130^e$. The traffic line $127^e$ is produced by filling the channel $126^e$ with concrete or other suitable material, and the division $128^e$ will be below the edge of said traffic line so as to avoid breaking the traffic line by separation or flexing actions of the slabs.

Figs. 30, 31 and 32 illustrate a further modification. Thus, the blades $65^g$ both cut down through the concrete to the sub-base, and after the blades are retracted, the concrete is removed from between the cuts made, producing a channel $126^g$ extending down to the sub-base. Concrete is routed out from the sides or walls of the channel, as at $130^g$, producing longitudinal grooves in the adjacent sides of the slabs between the road surface and sub-base. The channel is then filled with concrete to produce the traffic line and double construction joint. Thus, the traffic line and joint member $127^g$ has the tongues 131 at opposite sides fitted in the grooves $130^g$ to provide hinge joints permitting the slabs to flex upwardly and downwardly relatively to one another, but preventing relative vertical displacement of the adjacent edges of the slab.

Figs. 33 illustrates another use to which the machine can be put. A division plate 132, such as heretofore used, as hereinbefore referred to, may be deposited in the concrete after the concrete has been poured, instead of being set up on the sub-base prior to pouring. Thus, the blade $65^h$ of the machine has a pair of strips $65^i$ secured thereto and depending therefrom at opposite sides to provide a slot for receiving the upper edge portion of the division plate 132, in order that said division plate can be forced down into the plastic concrete, after which the blade $65^h$ is raised to deposit the division plate in the concrete to produce the construction joint.

Having thus described the invention, what is claimed as new is:—

1. A device of the character described comprising longitudinal joint producing means to operate on plastic concrete, transverse joint producing means to operate on the road and located at opposite sides of the line of the longitudinal joint producing means, and means for mounting said means for movement longitudinally over a plastic concrete road under construction.

2. A device of the character described comprising longitudinal joint producing means to operate on a plastic concrete road, transverse joint producing means to operate on the road and located at opposite sides of the line of the longitudinal joint producing means, and means for mounting said longitudinal and transverse joint producing means for movement on the side forms of the road.

3. A device of the character described comprising a travelling bridge to move over plastic concrete, a longitudinal joint producing blade carried by the bridge to operate on the concrete, and transverse joint producing blades carried by the bridge to operate on the concrete and located at opposite sides of the line of the longitudinal joint producing blade.

4. A device of the character described comprising a travelling bridge having means for mounting it for movement on the side forms of a plastic concrete road, a longitudinal joint producing blade carried by the bridge to operate on the road, and transverse joint producing blades carried by the bridge to operate on the concrete and located at opposite sides of the line of said longitudinal joint producing means.

5. A device of the character described comprising a travelling bridge to move along a plastic concrete road, longitudinal joint producing means carried by said bridge, and longitudinal boards for supporting workmen located at opposite sides of said means and movable transversely on the bridge toward and away from said means.

6. A device of the character described comprising a travelling bridge, a blade supported by the bridge for movement down into plastic concrete, and means carried by the bridge for supporting a strip and guiding it under said blade to be moved by the blade into the concrete.

7. A device of the character described comprising a travelling bridge, a bendable joint producing blade, means for guiding the end portions of the blade for up and down motion in the bridge, and means for bowing said blade to conform to curvatures in a road.

8. A device of the character described comprising a travelling bridge, a bendable blade having its end portions guided in the bridge for up and down movement, a member connected to the end portions of the blade and located at one side of the blade, and means connecting said member and blade intermediate their ends for bowing the blade.

9. A device of the character described comprising a travelling bridge, a joint producing blade movable upwardly and downwardly in the bridge, and means for moving the blade downwardly to enter the concrete with a series of vibratory blows.

10. A device of the character described comprising a carriage having wheels to travel on the side forms of a road, said wheels having flange to overlap said forms and having ridges to ride on the forms and cut through concrete that may be on the forms.

11. A device of the character described comprising a carriage having wheels to travel on the side forms of a road, said wheels having opposite side flanges to overlap the opposite sides of said forms, each wheel having a rib between its flanges of a height to space the rim of the wheel above a film of concrete on the corresponding form, said rib having a rounded ridge and diverging sides.

12. A device of the character described comprising a carriage movable longitudinally of a plastic concrete road under construction, and a vertically movable longitudinal blade carried by the carriage and adapted to be moved down into the plastic concrete at successive positions of the carriage along the road, to produce a continuous longitudinal incision in the concrete, said blade being adapted to receive a doubled strip thereon and to force said strip down into the incision.

13. A device of the character described comprising a carriage having means movable on the side forms of a plastic concrete road under construction, and a vertically movable longitudinal blade carried by the carriage and adapted to be moved down into the plastic concrete, to produce an incision in the concrete parallel with one of said forms said blade being adapted to receive a doubled strip thereon and to force said strip down into the incision.

14. A device of the character described comprising a carriage movable longitudinally of a plastic concrete road under construction, a vertically movable longitudinal flexible blade carried by the carriage and adapted to be moved down into the plastic concrete, and means for flexing said blade to different curvatures.

15. A device of the character described comprising a carriage movable longitudinally of a plastic concrete road under construction, and a vertically movable longitudinal blade mounted on the carriage for transverse adjustment and adapted to be moved downwardly into the plastic concrete at successive positions of the carriage along the road, to produce a continuous longitudinal incision in the concrete, said blade being adapted to receive a doubled strip thereon and to force said strip down into the incision.

16. A device of the character described comprising a carriage movable longitudinally of a plastic concrete road under construction, a longitudinal blade adapted to be moved downwardly into the plastic concrete, and independent means connecting the opposite end portions of the blade with the carriage for independently moving the end portions of the blade downwardly and upwardly.

17. A device of the character described comprising a carriage movable longitudinally of a plastic concrete road under construction, a longitudinal flexible blade guided at its ends for vertical movement in the carriage, means carried by the blade for flexing same to different curvatures, and means mounted on the carriage for raising and lowering said blade.

18. A device of the character described comprising a carriage movable longitudinally of a plastic concrete road under construction, a longitudinal flexible blade, the carriage having vertical guides for the end portions of the blade, means carried by the blade for flexing same to different curvatures, and means mounted on the carriage and connected to the end portions of the blade for raising and lowering the blade.

19. A device of the character described comprising a carriage movable longitudinally of a plastic concrete road under construction, a vertically movable longitudinal blade carried by the carriage and adapted to be moved down into the plastic concrete, and means carried by the carriage in advance of said blade for deflecting solid particles from the line of said blade.

20. A device of the character described comprising a carriage movable over plastic concrete, a blade mounted in the carriage for upward and downward movement and adapted to enter the plastic concrete, and means carried by the blade operable for flexing the blade to different curvatures.

21. A device of the character described comprising a carriage movable over plastic concrete, a blade mounted on the carriage for movement in the plastic concrete to produce an incision therein, and means for vibrating said blade.

22. A device of the character described comprising a carriage movable over plastic concrete, a blade mounted on the carriage to move in the plastic concrete, and means for supplying joint producing material to said blade to be deposited thereby in the concrete.

23. A device of the character described comprising a carriage movable over plastic concrete, joint producing means mounted on the carriage to work in plastic concrete, and means for supplying a strip to said means to be embedded thereby in the concrete.

24. A device of the character described comprising a carriage movable over plastic concrete, a blade mounted on the carriage to work in the plastic concrete, and means for supplying a strip longitudinally of the blade to be embedded by said blade in the concrete.

25. A device of the character described comprising a carriage movable over plastic concrete, a blade mounted on the carriage for movement down into the plastic concrete, and means for delivering a strip below said blade to be forced down into the concrete with the blade.

26. A device of the character described comprising a carriage movable over plastic concrete, means mounted on the carriage to work in the plastic concrete for producing a joint separation therein, and means mounted on the carriage operable in the plastic concrete in advance of said means for deflecting stones and coarser aggregate out of the line of movement of the firstnamed means.

27. A device of the character described comprising a carriage movable over plastic concrete, a blade mounted on the carriage to work in the plastic concrete, and a roll of joint material mounted on the carriage and adapted to be unrolled and moved longitudinally of said blade to be deposited by the blade in the concrete.

28. The method of building a surfacing structure from plastic material consisting in pouring and finishing the surface of the plastic material, separating the material along the line of a joint and deflecting the coarser aggregate from said line, and then forcing a strip downwardly into the plastic material along said continuous line and in rear of the point of separation.

29. The method of building a surfacing structure from plastic material consisting in pouring and finishing the surface of the plastic material, separating the material along the line of a joint and deflecting the coarser aggregate from said line, and then forcing a blade into the plastic material along said continuous line and in rear of the point of separation.

30. The method of building a surfacing structure from plastic material consisting in pouring and finishing the surface of the plastic material, separating the material along the line of a joint and deflecting the coarser aggregate from said line, and then forcing a blade into the plastic material along said continuous line and in rear of the point of separation and depositing joint material in the separation made by the blade.

31. The method of building a surfacing structure from plastic material consisting in pouring and finishing the surface of the plastic material, moving a blade in the material along the line of a joint and deflecting the coarser aggregate from said continuous line, and then forcing a strip downwardly into the plastic material along said line and in rear of the point of separation.

32. The method of building a surfacing structure from plastic material consisting in pouring and finishing the surface of the plastic material, moving a blade in the material along the line of a joint and deflecting the coarser aggregate from said line, and then moving a second blade in the plastic material along said continuous line at a distance in rear of the firstnamed blade.

33. The method of building a surfacing structure from plastic material consisting in pouring and finishing the surface of the plastic material, moving a blade in the material along the line of a joint and deflecting the coarser aggregate from said line, and then moving a second blade in the plastic material along said continuous line at a distance in rear of the firstnamed blade and depositing joint material in the separation made by the secondnamed blade.

34. Apparatus of the character described comprising means adapted to work in plastic material for deflecting the coarser aggregate from the line of a joint, and means in rear of said means adapted for forcing a strip downwardly into the plastic material along said line.

35. Apparatus of the character described comprising means adapted to work in plastic material for deflecting the coarser aggregate from the line of a joint, and a blade operable in rear of said means to work in the material in said line.

36. Apparatus of the character described comprising a blade adapted to work in plastic material for deflecting coarser aggregate from the line of a joint, and means in rear of said blade for forcing a strip downwardly into the plastic material along said line.

37. Apparatus of the character described comprising a blade adapted to work in plastic material for deflecting coarser aggregate out of the line of a joint, and a second blade in rear of the first named blade adapted to work in said material along said line.

38. An apparatus of the character described comprising a rotary cutting disk movable in plastic material for deflecting the coarser aggregate from the line of a joint, and a blade in rear of said disk adapted to work in said material along said line.

39. An apparatus of the character described comprising a blade adapted to work in plastic material for deflecting the coarser aggregate from the line of a joint, a second blade in rear of the firstnamed blade to work in the material along said line, and means for supporting the firstnamed blade for movement over the material and for guiding the secondnamed blade for movement in the material.

40. Apparatus of the character described comprising a joint installing member movable in the plastic material, and means in advance of said member adapted to work in the plastic material along the line of movement of said member for deflecting coarser aggregate out of said line.

In testimony whereof I hereunto affix my signature.

JOHN N. HELTZEL.